Aug. 12, 1941.  A. S. BORBA  2,252,161
CLEAR VIEW STRUCTURE FOR VEHICLES
Filed Sept. 14, 1938  2 Sheets-Sheet 1
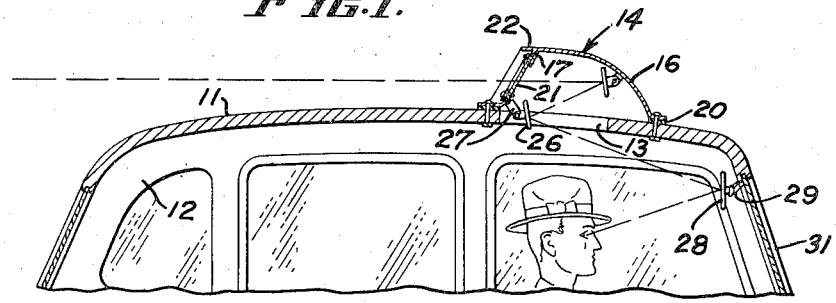
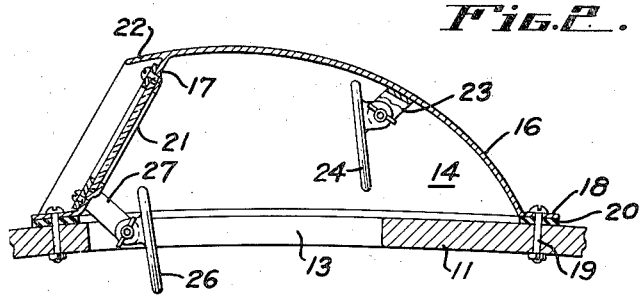
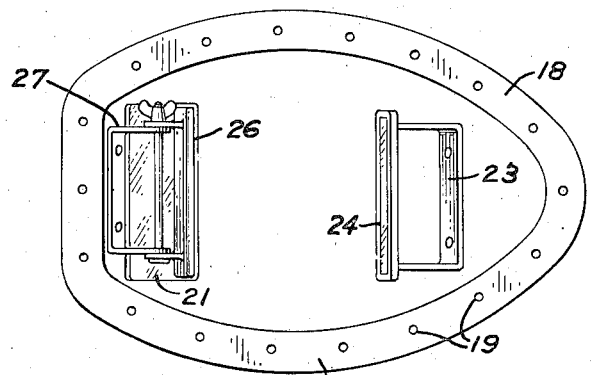
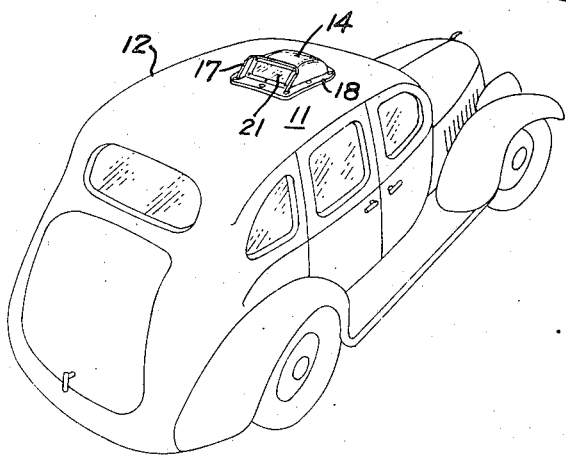
INVENTOR.
ANTONE S. BORBA
BY
ATTORNEY Aug. 12, 1941.　　　A. S. BORBA　　　2,252,161
CLEAR VIEW STRUCTURE FOR VEHICLES
Filed Sept. 14, 1938　　　2 Sheets-Sheet 2

INVENTOR.
ANTONE S. BORBA
BY Arlington E. White
ATTORNEY.

Patented Aug. 12, 1941

2,252,161

UNITED STATES PATENT OFFICE 2,252,161

CLEAR VIEW STRUCTURE FOR VEHICLES

Antone S. Borba, Oakland, Calif.

Application September 14, 1938, Serial No. 229,885

2 Claims. (Cl. 88—86)

The invention, in general, relates to means for affording clear vision to the rear of vehicles. More particularly, the invention relates to a housing or shell in combination with the top of a vehicle body, together with an association of mirrors for enabling an operator of a vehicle clearly to observe conditions of the traffic to the rear of the vehicle.

The present invention constitutes an advance over the invention disclosed and claimed by applicant in his Letters Patent, No. 2,085,000, granted June 29, 1937.

A primary object of the present invention is to provide a structure of the indicated nature which is especially suitable for adaptation to passenger motor vehicles and light commercial trucks, and the like.

Another object of the invention is to provide a clear view structure of the aforementioned character which inherently possesses, in addition to the utility stated, features adaptable to the stream-line motif of passenger and light commercial motor vehicles, thus not detracting from the appearance thereof.

A still further object of my invention is to provide a structure of the indicated character which is relatively simple and inexpensive to manufacture as well as to install upon a vehicle.

Other objects of the invention, together with some of the advantageous features thereof, will appear from the following description of a preferred embodiment of the invention, as well as one modification thereof, which are illustrated in the accompanying drawings. It should be understood that I am not to be limited to the precise embodiments of the invention as shown in the drawings, as my invention, as defined in the appended claims, can be embodied in a plurality and variety of forms.

Referring to the drawings:

Figure 1 is a sectional elevation of a preferred embodiment of the invention.

Figure 2 is an enlarged sectional elevation similar to the view shown in Figure 1, but omitting one element thereof.

Figure 3 is a top plan view of the embodiment of the invention shown in Figure 1.

Figure 4 is a perspective view of a passenger motor vehicle illustrating the installation of the preferred embodiment of the invention.

Figure 5:
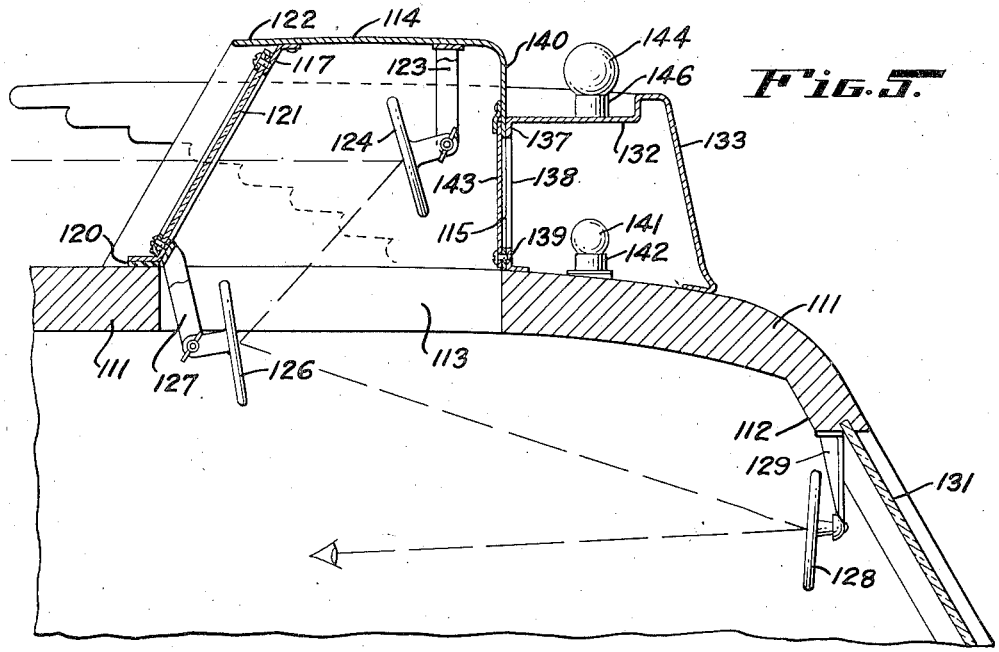
Figure 5 is an enlarged sectional elevation of a modified embodiment of the invention.

In its preferred form, the clear view structure of my invention preferably comprises, in combination, a vehicle body including a top having an opening therein, a shell secured to said top and surrounding said opening; said shell having a front wall sloping toward the front of the vehicle and a rear wall inclined with respect to said top, a window in said rear wall, a first mirror hingedly mounted within said shell adjacent to said front wall in line with and facing said window, a second mirror hingedly mounted within said shell and depending into said opening from said rear wall; said second mirror facing said first mirror, together with a third mirror hingedly mounted within said vehicle body and facing said second mirror; all three of said mirrors being adapted to be adjusted relative to one another so that an operator of the vehicle may have a clear view of traffic conditions to the rear of the vehicle through said window in said rear wall.

In Figures 1, 2 and 4 of the drawings, I have illustrated the clear view structure of my invention as applied to a passenger motor vehicle, but such type of vehicle is shown for illustrative purposes only since, as indicated above, the invention is readily adaptable to light commercial vehicles as well as trucks.

In accordance with the invention, the top 11 of a vehicle body 12 is provided with an opening 13 which conveniently may be located approximately directly above the seat normally occupied by the operator of the vehicle. In combination with the vehicle body 12, I provide a shell 14 which, in operative position, completely surrounds the openings 13 in the top 11 and which preferably is formed with a front wall 16 that slopes toward the front of the vehicle. Moreover, I preferably form the rear wall 17 of the shell 14 so that it is inclined with respect to the vehicle top 11, as shown, in order that the addition of the shell 14 to the vehicle top will not detract from but rather enhance the general streamline motif of the vehicle. The lower perimeter of the shell 14 is conveniently provided with a flange 18 for enabling the attachment of the shell to the top 11 which can be effected by means of screw-bolts 19, as illustrated. In order to effect a water-proof joint between the shell and the top, I provide a gasket 20 preferably fabricated of sponge rubber, for insertion underneath flange 18 of the shell.

As illustrated particularly in Figures 1 and 2 of the drawings, and in accordance with the present invention, rear wall 17 of the shell 14 is provided with a window 21 which conveniently is protected from rain and the rays of the sun by a shade 22, the latter forming an extension of the top of the shell. The shell 14 may be fabricated of any suitable material, such as metal or relatively hard rubber. Hingedly mounted within the shell upon a bracket 23 secured to the front wall 16 thereof is a first mirror 24 which is aligned with the window 21 and faces the same so that objects, such as the road and vehicles thereon, to the rear of the vehicle may be observed by looking into mirror 24 which reflects such objects through window 21.

Also provided within shell 14 is a second mirror 26 which preferably is hingedly mounted on a bracket 27 depending from the rear wall 17 of the shell so as to extend into opening 13 of the top 11. As illustrated, the second mirror 26 is faced towards the first mirror 24 so that images reflected in mirror 24 will be picked up in the second mirror 26. To complete the combination, a third mirror 28 is provided and hingedly mounted within the vehicle body 12, preferably on a bracket 29 secured to a panel within the body and approximately just above the windshield 31 of the vehicle. The third mirror 28 is mounted so as to face the second mirror 26 and it will be clear from a study of the accompanying drawings that all three of the mirrors can be adjusted relative to one another so that images picked up in the first mirror 24 will first be transmitted to the second mirror 26 and reflected in the third mirror 28. The dotted line showing of Figure 1 illustrated the line of vision from the eye of an operator of the vehicle and indicates the manner of observing traffic conditions to the rear of the vehicle merely by glancing into mirror 28 mounted within the vehicle body. In order to obtain increased vision through the window 21, the side walls of the shell 14 are flared outwardly adjacent to the rear wall 17 thereof, as particularly shown in Figure 4 of the drawings.

Figure 6:
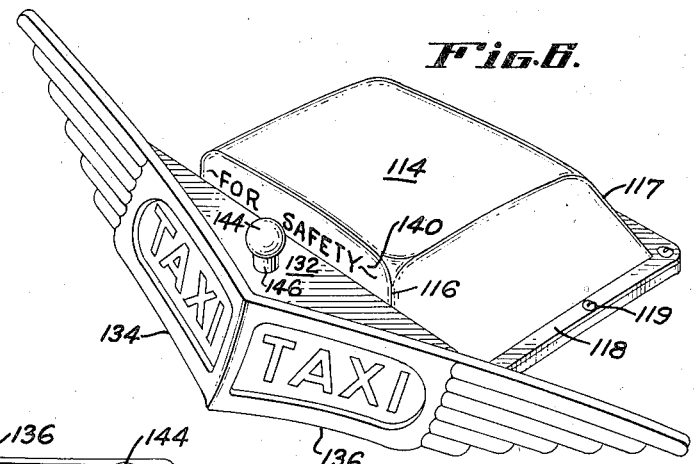
Figure 6 is a perspective view of the modified embodiment shown in Figure 1.
Figure 7:
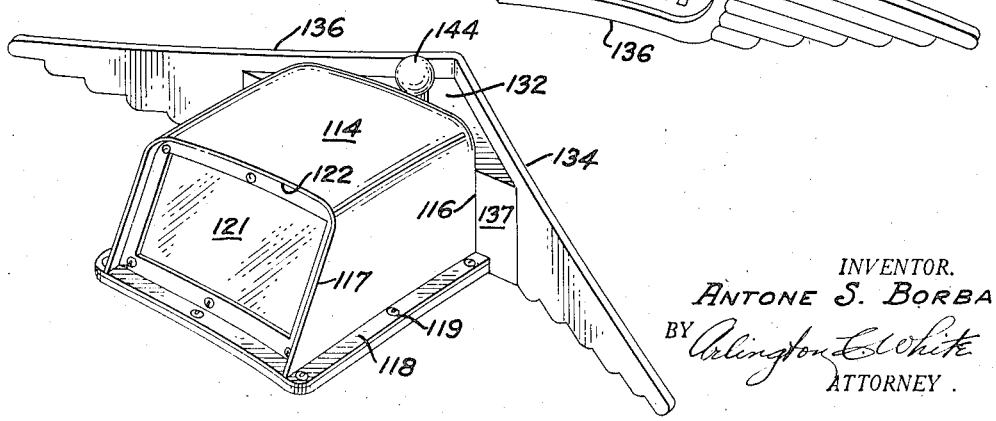
Figure 7 is another perspective view of the modified embodiment looking from the rear.

In Figures 5 to 7 of the drawings, I have illustrated a modified embodiment of the clear view structure of my invention as applied to light commercial motor vehicles, such as a taxi-cab embellished with an advertising device. These views clearly depict the ready adaptability of the structure to unique conditions and without alterations to existing commercial display media.

As shown, the top 111 of a cab body 112 is provided with an opening 113 which preferably, like the preferred embodiment of the invention shown in Figures 1 to 4 inclusive, is located approximately directly above the seat normally occupied by the driver of the cab. In combination with the cab body 112, I provide a shell 114 which, in operative position, completely surrounds the opening 113 and preferably is formed with a substantially vertical front wall 116 having an opening 115 therein for the purpose hereinafter stated. The shell 114 is formed with a sloping rear wall 117 for conformance with the streamline motif of the vehicle body 112, and the lower perimeter of the shell is provided with a flange 118 for enabling the attachment of the shell to the top 111 in any desired manner, such as by means of screw bolts 119. A gasket 120, preferably fabricated of sponge rubber, is inserted between flange 118 of the shell and the top 111 as a weatherproof means.

In accordance with the invention, the rear wall 117 of the shell 114 is provided with a window 121 which is protected from rain and the like, and the rays of the sun by a shade 122 which conveniently may constitute an extension of the top of the shell. Hingedly mounted within the shell 114 upon brackets 123 secured to the top thereof, and adjacent to the front wall 116, is a mirror 124 which is aligned with the window 121 and faces the same. Thus, objects to the rear of the vehicle, such as the road and vehicles thereon, will be reflected in mirror 124. As illustrated particularly in Figure 5 of the drawings, a second mirror 126 is provided in the combination and such mirror may be hingedly fastened on brackets 127 secured to the shell 114, as shown, or, if desired, can be hingedly mounted on such brackets secured to the top 111 of the vehicle body so that the mirror, in either case, depends into the opening 113 of the top, as shown. Mirror 126 is so mounted that it faces mirror 124 and thus will pick up the images reflected therein. I also provide a third mirror 128 which preferably is hingedly mounted within the vehicle body 112 on a bracket 129 secured to an interior panel of the body adjacent to the windshield 131 of the vehicle. The third mirror 128 is faced toward the second mirror 126 and thus, as is evident, the adjustment of the three mirrors relative to one another will enable the operator of the vehicle to observe traffic conditions to the rear of the vehicle by merely glancing into the third mirror 128, since all images sighted through window 121 in the rear wall of the shell 114 will be reflected in the first mirror 124, picked up in turn by the second mirror 126 and transmitted through opening 113 of the top 111 and reflected in the third mirror 128, all as indicated by the dotted lines of Figure 5 of the drawings.

In combination with the shell 114 and mounted on the top 111 of the vehicle body in juxtaposition with respect to the shell, I provide a device suitable for display advertising. In the embodiment illustrated, the device preferably comprises a box-like structure 132 having a generally V-shaped front wall 133 to which is secured a pair of strips 134 and 136 defining panels and having their outer extremities serrated to effect a general wing-shape formation, see Figures 6 and 7 of the drawings. A substantially vertical rear wall 137 is provided on the box-like structure 132 and an opening 138 formed therein for registry with the opening 115 in the front wall 116 of the shell 114. Rear wall 137 of the structure 132 is detachably fastened by means of screws 139 to the front wall 116 of the shell, as illustrated, and the rear wall 137 of the structure preferably is made to a lesser height than the front wall 116 of the shell so that the latter presents a panel 140 for the reception of lettering, such as the words "For safety," as indicated in Figure 6 of the drawings.

In order that the advertising device above described may be readily seen after dark, an electrical circuit is provided, not shown, for energizing a lamp 141 which conveniently is mounted in a socket 142 fastened within the box-like structure 132. Should lamp 141 become damaged or burn out, the same may readily be replaced with a new lamp as access to the interior of the structure 132 is had through openings 115 and 138 of the shell and structure, respectively, the opening 115 of the shell normally being closed by a closure 143. A second lamp 144 also can be interposed in the electrical circuit and is mounted in a socket 146 secured in the top of the structure 132, as plainly indicated in Figures 5 to 7 of the drawings. As shown, the strips 134 and 136 fastened to the front wall of the box-like structure 132 presents panels for the reception of any desired lettering, such as the word "Taxi," or any other symbol or trade-mark. It will be clear from a study of the accompanying drawings that the shell 114 of the combination can readily be adapted to any form of advertising structure carried on the top of a vehicle body and can be detachably associated therewith for convenient access thereto or replacement of the same with advertising media of other types.

It is to be understood that the appended claims are to be accorded a range of equivalents commensurate in scope with the advance made over the prior art.

I claim:

1. A combined rear view device and advertising medium for adaptation to motor vehicles comprising the combination of a vehicle body including a top having an opening therein, a shell mounted on said top and enclosing said opening, a front wall on said shell having an opening therein, a sloping rear wall on said shell, a window in said rear wall, a first mirror adjustably mounted within said shell and faced toward said window, a second mirror fastened to said rear wall and faced toward said first mirror; said second mirror depending into said opening in said top, a third mirror adjustably mounted within said vehicle body and faced toward said second mirror, a box-like structure mounted on said vehicle top in juxtaposition to said shell, a rear wall on said structure detachably fastened to the front wall of said shell; said rear wall of said structure having an opening therein registering with the opening in said front wall of said shell, and a front wall in said structure defining panels for the reception of advertising media or indicia.

2. A clear view structure for vehicles comprising, in combination, a vehicle body having a top with an opening therein, a mirror adjustably mounted within said body and adapted to be faced toward said opening, a shell detachably seated upon the upper surface of said top enclosing said opening, a rear wall on said shell sloping toward the rear of the vehicle, a window in said rear wall, a mirror hingedly mounted within said shell and facing said window, a bracket secured within said shell below said window, arms on said bracket depending into the opening of said top, and a mirror hingedly mounted on said arms adjacent the outer extremities thereof; said last named mirror being adapted to be adjusted to face both said mirror within said body and said mirror within said shell so that an operator of the vehicle may observe traffic conditions to the rear of the vehicle by glancing into the mirror mounted within the vehicle.

ANTONE S. BORBA.